US009625655B1

(12) United States Patent
Zhu et al.

(10) Patent No.: US 9,625,655 B1
(45) Date of Patent: Apr. 18, 2017

(54) OPTICAL FIBER SOCKET AND OPTICAL FIBER PLUG

(71) Applicant: Amphenol Fiber Optic Technology (Shenzhen) Co., Ltd., Shenzhen, Guangdong Province (CN)

(72) Inventors: Ling-Hua Zhu, Shenzhen (CN); Song-Sheng Li, Shenzhen (CN); Xue-Wu Lei, Shenzhen (CN)

(73) Assignee: Amphenol Fiber Optic Technology (Shenzhen) Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 15/217,115

(22) Filed: Jul. 22, 2016

(30) Foreign Application Priority Data

Feb. 24, 2016  (TW) .............................. 105202552 U

(51) Int. Cl.
*G02B 6/38* (2006.01)
(52) U.S. Cl.
CPC ......... *G02B 6/3825* (2013.01); *G02B 6/3874* (2013.01); *G02B 6/3887* (2013.01)

(58) Field of Classification Search
CPC .. G02B 6/3893; G02B 6/3825; G02B 6/3887; G02B 6/3885; G02B 6/3821; G02B 6/3874
See application file for complete search history.

(56) References Cited

U.S. PATENT DOCUMENTS

| 7,575,459 | B2 * | 8/2009 | Nickol | H01R 13/622 439/253 |
| 7,654,747 | B2 | 2/2010 | Theuerkorn | |
| 9,316,794 | B2 * | 4/2016 | Chen | G02B 6/3672 |

* cited by examiner

*Primary Examiner* — Jennifer Doan
(74) *Attorney, Agent, or Firm* — Muncy, Geissler, Olds & Lowe, P.C.

(57) ABSTRACT

An optical fiber socket for being connected to an optical fiber plug and a first optical fiber cable includes a socket sleeve unit, a socket shell having a surrounding wall that defines a connecting hole for insertion of the first optical fiber cable thereinto and for being engaged with the optical fiber plug, a plurality of spaced-apart receiving holes that extend radially through the surrounding wall and that communicate with the connecting hole, and a plurality of locking members that are movably and respectively disposed in the receiving holes, and a socket guiding unit. When the optical fiber socket is connected to the optical fiber plug, the locking members are urged to move toward and clamp the optical fiber plug.

9 Claims, 7 Drawing Sheets

OPTICAL FIBER SOCKET AND OPTICAL FIBER PLUG

CROSS-REFERENCE TO RELATED APPLICATION

This application claims priority of Taiwanese Patent Application No. 105202552, filed on Feb. 24, 2016.

FIELD

The disclosure relates to an optical fiber coupling device, and more particularly to a multi-core optical fiber coupling device.

BACKGROUND

As shown in FIG. 1, a conventional optical fiber coupling device 1 disclosed in U.S. Utility Pat. No. 7,654,747B2 includes a multi-fiber optical fiber socket 11 and a multi-fiber optical fiber plug 12 connected to the optical fiber socket 11.

The optical fiber socket 11 includes a socket shell 111 formed with an outer thread 112, a ferrule boot 113 fixedly connected to the socket shell 111, a receptacle ferrule 114 extending through and exposed toward the socket shell 111, and a socket resilient member 115 having two ends that respectively abut against the ferrule boot 113 and the receptacle ferrule 114.

The optical fiber plug 12 includes an outer shell 121, a plug head 122 disposed in the outer shell 121 and disposed for connection with the socket shell 111 of the optical fiber socket 11, a tail tube 123 disposed in the outer shell 121 and connected to a rear end portion of the plug head 122, a plug ferrule 124 disposed in and exposed from the socket head 122, a plug resilient member 125 having two ends that respectively abut against the plug ferrule 124 and the tail tube 123, and a coupling sleeve 126 sleeved on the outer shell 121 and formed with an inner thread 127 that is threadedly coupled to the outer thread 112.

By way of the outer thread 112 and the inner thread 127, the optical fiber socket 11 can be firmly connected to the optical fiber plug 12. However, a user needs to rotate the coupling sleeve 126 for connecting/disconnecting the optical fiber socket 11 to/from the optical fiber plug 12, leading to a time-consuming and an inconvenient operation.

SUMMARY

Therefore, an object of the disclosure is to provide an optical fiber socket that can be swiftly connected to an optical fiber plug.

According to the disclosure, the optical fiber socket is adapted to be connected to the optical fiber plug and a first optical fiber cable, and includes a socket sleeve unit adapted to be sleeved on the first optical fiber cable, a socket shell and a socket guiding unit. The socket shell has a surrounding wall connected to the socket sleeve unit and defining a connecting hole that is adapted for insertion of the first optical fiber cable thereinto and that is adapted to be engaged with the optical fiber plug, a plurality of spaced-apart receiving holes extending radially through the surrounding wall, and communicating with the connecting hole, and a plurality of locking members movably and respectively disposed in the receiving holes. The socket guiding unit is disposed fixedly in the socket sleeve unit and the socket shell, is exposed toward the connecting hole, and is adapted to be connected to the first optical fiber cable. When the optical fiber socket is connected to the optical fiber plug, the locking members are urged to move toward and clamp the optical fiber plug.

Another object of the disclosure is to provide an optical fiber plug that can be swiftly connected to the above-mentioned optical fiber socket.

According to the disclosure, the optical fiber plug is adapted to be connected to the optical fiber socket and a second optical fiber cable, and includes a plug sleeve unit adapted to be sleeved on the second optical fiber cable, a plug unit, a plug guiding unit and a coupling unit. The plug unit is connected to the plug sleeve unit, is adapted for insertion of the second optical fiber cable thereinto, and is insertable into the connecting hole of the socket shell of the optical fiber socket. The plug guiding unit is fixedly disposed in the plug unit and is adapted to be connected to the second optical fiber cable. The coupling unit includes a coupling sleeve sleeved on the plug unit and the plug guiding unit, and a coupling resilient member having two ends that respectively abut against the plug unit and the coupling sleeve. When the optical fiber socket is connected to the optical fiber plug, the locking members of the socket shell of the optical fiber socket are urged by the coupling sleeve to move toward and clamp the plug unit of the optical fiber plug. When the optical fiber socket is connected to the optical fiber plug, the coupling sleeve is movable against a resilient force of the coupling resilient member to release the locking members to permit separation of the optical fiber socket from the optical fiber plug.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
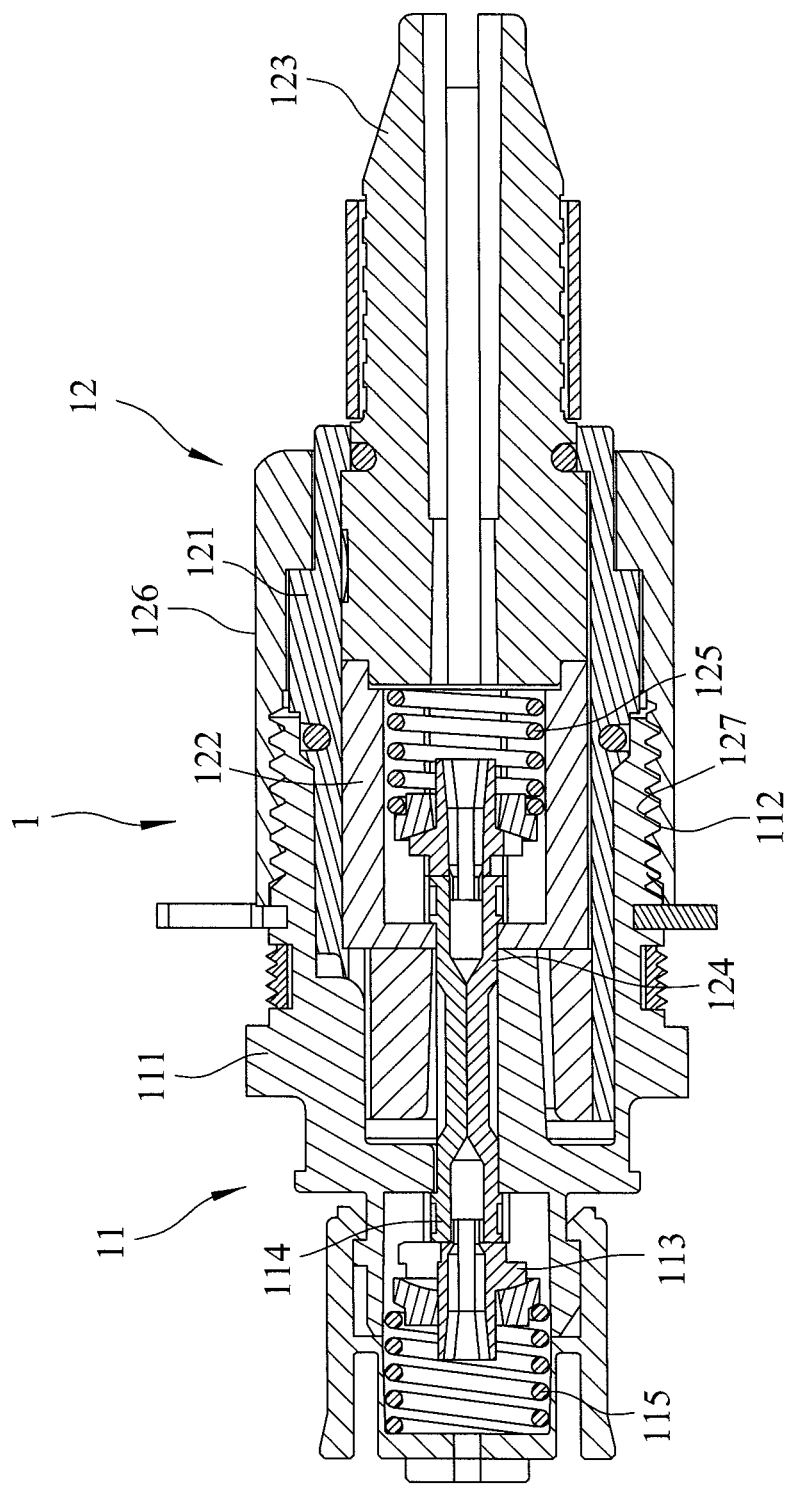
FIG. 1 is a sectional view of a conventional optical fiber coupling device disclosed in U.S. Utility No. 7,654,747B2.
Figure 2:
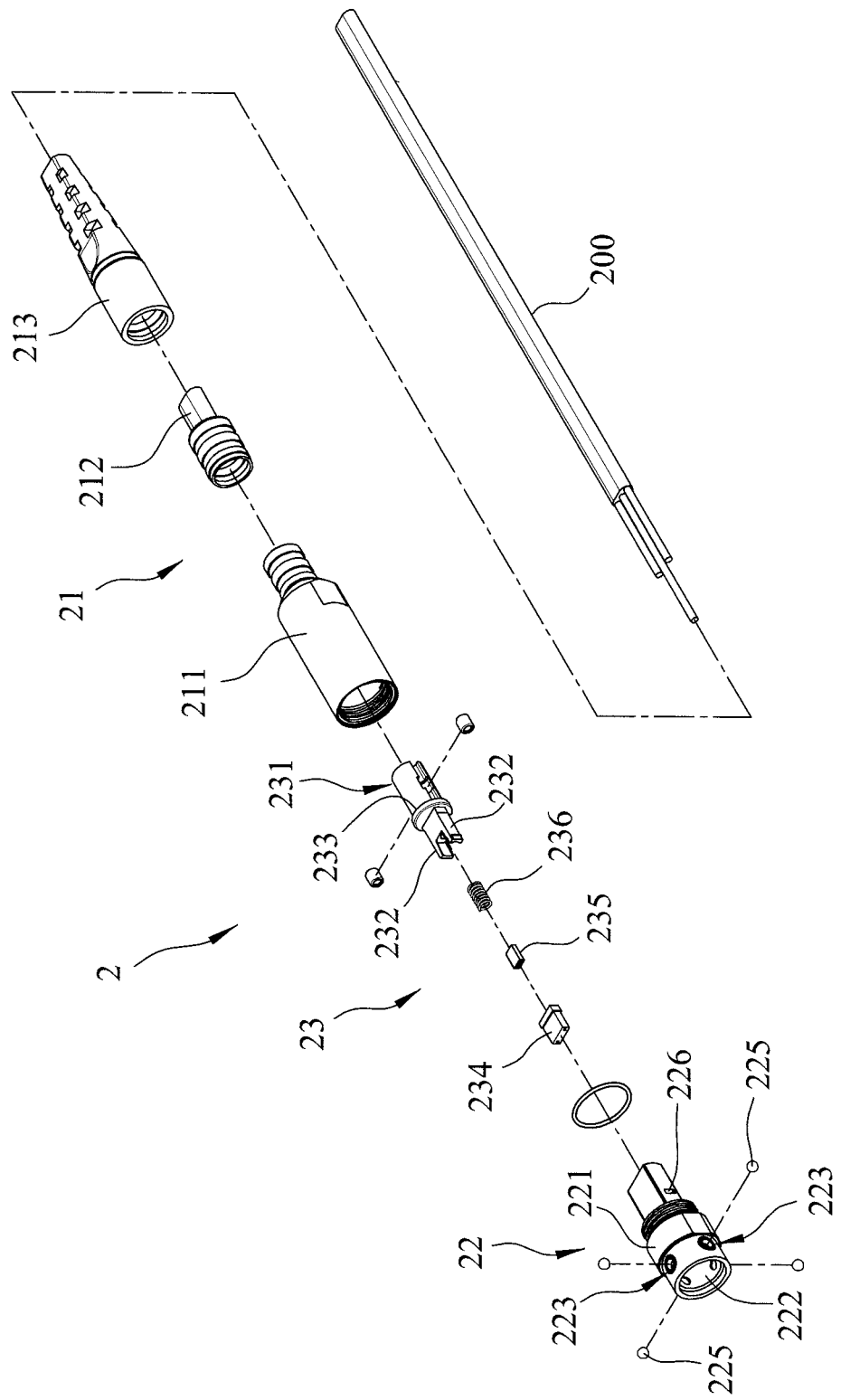
FIG. 2 is an exploded perspective view of an optical fiber socket of an exemplary embodiment of an optical fiber coupling device according to the disclosure.
Figure 3:
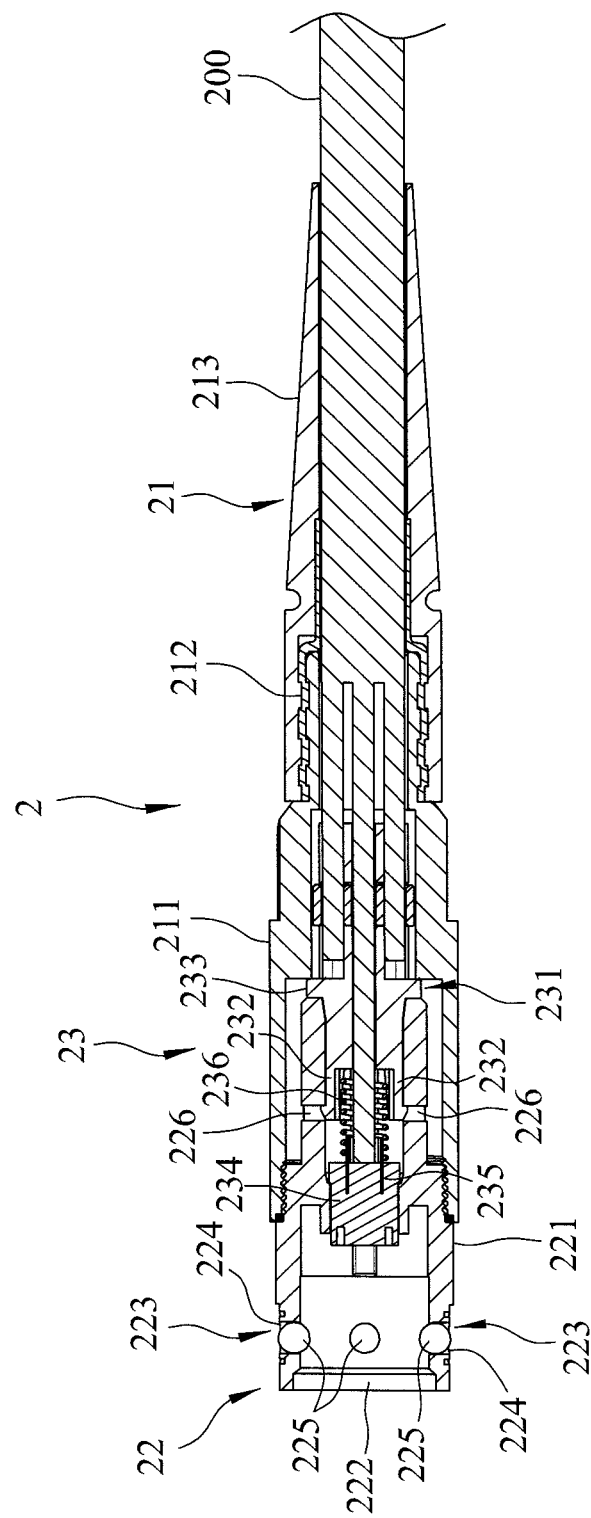
FIG. 3 is a sectional view of the optical fiber socket of the exemplary embodiment.

Referring to FIGS. 2 to 7, the exemplary embodiment of an optical fiber coupling device according to the present disclosure includes an optical fiber socket 2 and an optical fiber plug 3. The optical fiber socket 2 is connected to the optical fiber plug 3 and is adapted to be connected to a first optical fiber cable 200. As illustrated in FIGS. 2 and 3, the optical fiber socket 2 may include a socket sleeve unit 21 adapted to be sleeved on the first optical fiber cable 200, a socket shell 22 connected to the socket sleeve unit 21, and a socket guiding unit 23 disposed fixedly in the socket sleeve unit 21 and the socket shell 22, and adapted to be connected to the first optical fiber cable 200.

As shown in FIG. 3, the socket sleeve unit 21 of this embodiment includes an outer sleeve 211 threadedly connected to the socket shell 22, a socket tail tube 212 connected to a rear end portion of the outer sleeve 211, and a socket tail cover 213 sleeved on the socket tail tube 212.

As shown in FIGS. 2 and 3, the socket shell 22 of this embodiment has a surrounding wall 221 connected to a front end of the socket sleeve unit 21 and defining a connecting hole 222 that is adapted for insertion of the first optical fiber cable 200 thereinto, and that is adapted to be engaged with the optical fiber plug 3, a plurality of spaced-apart receiving holes 223 extending radially through the surrounding wall 221 and communicating with the connecting hole 222, a plurality of locking members 225 movably and respectively disposed in the receiving holes 223, and a plurality of first engaging grooves 226 extending radially through the surrounding wall 221.

Figure 4:
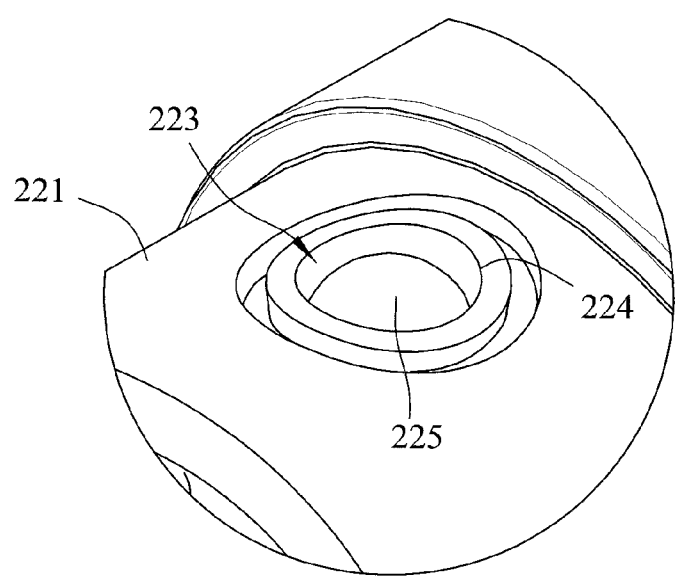
FIG. 4 is a fragmentary enlarged view of a receiving hole of the optical fiber socket of the exemplary embodiment.

As shown in FIGS. 3 and 4, in this embodiment, each of the locking members 225 of the socket shell 22 is a bead, and each of the receiving holes 223 of the socket shell 22 has two opposite openings 224, each of which has a diameter smaller than that of each of the locking members 225. In practice, for each receiving hole 223, the opening 224 formed on an outer surface of the surrounding wall 221 may have a reduced diameter and may be formed by pressing using a tool, so as to prevent a respective one of the locking members 225 from rolling out of the receiving hole 223.

As shown in FIGS. 2 and 3, the socket guiding unit 23 of this embodiment includes a first connecting member 231, a first ferrule 234, a first guiding tube 235, and a first resilient member 236. The first connecting member 231 is connected fixedly between the outer sleeve 211 of the socket sleeve unit 21 and the socket shell 22, and is adapted for insertion of the first optical fiber cable 200 therethrough. The first ferrule 234 has a portion extending into the surrounding wall 221 of the socket shell 22 and exposed toward the connecting hole 222 for being connected to the first optical fiber cable 200. The first guiding tube 235 has a portion penetrating into the first ferrule 234 from an end surface which faces the first connecting member 231, and an opposite portion adapted to surround the first optical fiber cable 200. The first resilient member 236 has two ends that respectively abut against the first ferrule 234 and the first connecting member 231 for biasing the first ferrule 234 away from the first connecting member 231. The first connecting member 231 of the socket guiding unit 23 has a plurality of first engaging hooks 232 extending into the surrounding wall 221 of the socket shell 22 and respectively engaging the first engaging grooves 226 of the socket shell 22, and a first flange 233 clamped between the outer sleeve 211 of the socket sleeve unit 21 and the socket shell 22.

In this embodiment, the first optical fiber cable 200, to which the first connecting member 231 is adapted to be connected, is a flat-type optical fiber. It should be noted that other types of the first optical fiber cable 200 may be adopted in other embodiments of the present disclosure.

Figure 5:
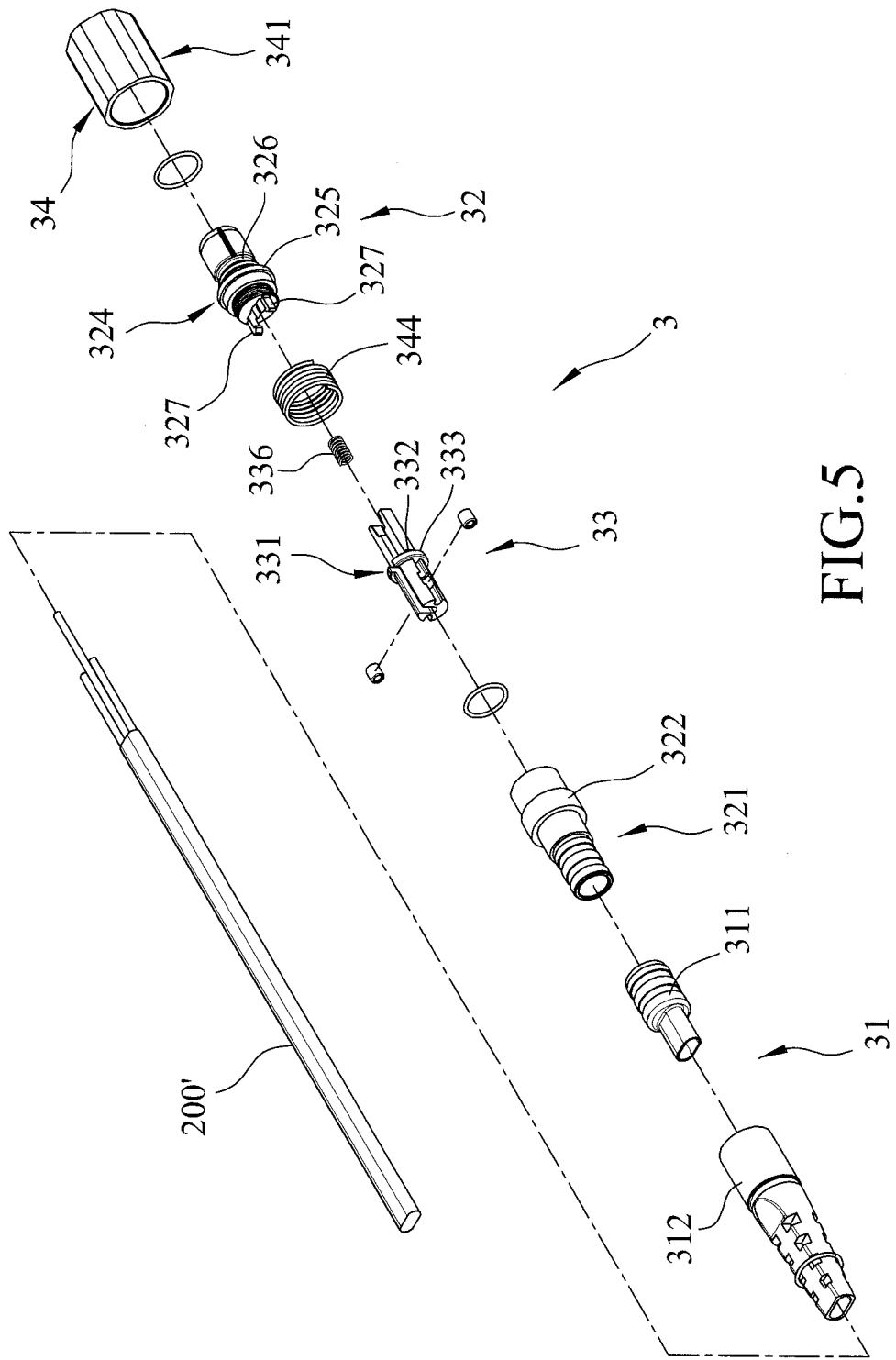
FIG. 5 is a partly exploded perspective view of an optical fiber plug of the exemplary embodiment.
Figure 6:
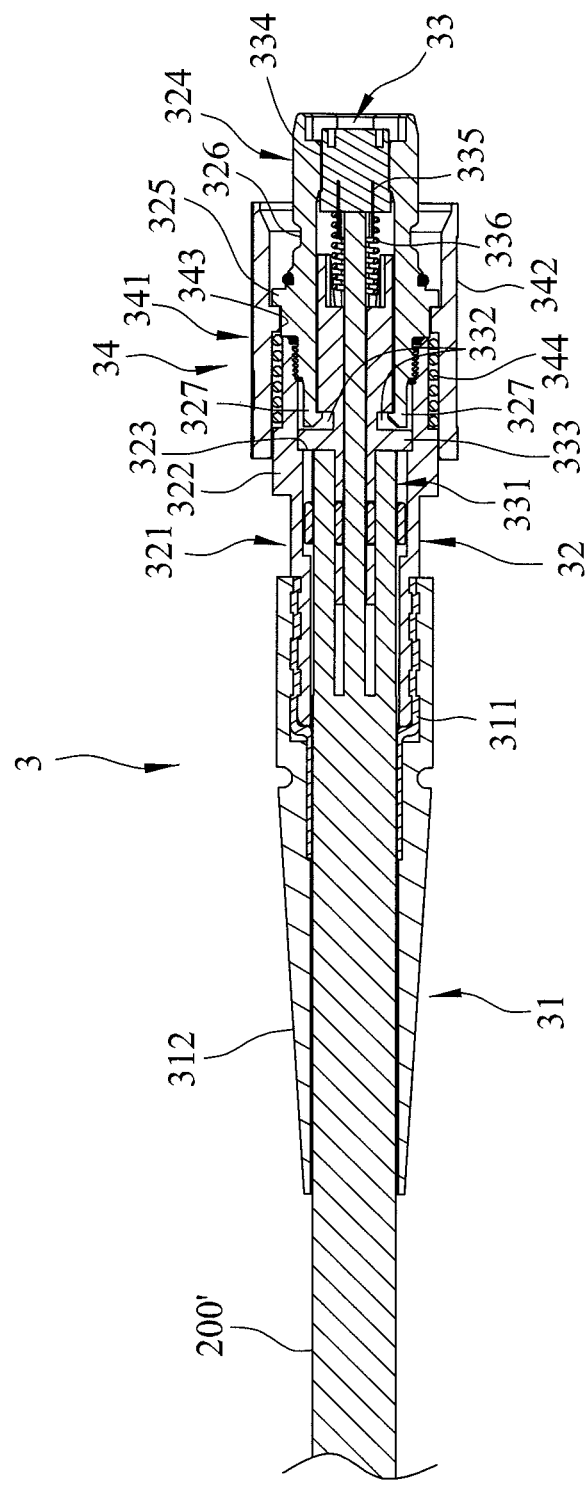
FIG. 6 is a sectional view of the optical fiber plug of the exemplary embodiment.

As shown in FIGS. 5 and 6, the optical fiber plug 3 of the exemplary embodiment is connected to the optical fiber socket 2 and is adapted to be connected to a second optical fiber cable 200'. The optical fiber plug 3 may include a plug sleeve unit 31, a plug unit 32, a plug guiding unit 33, and a coupling unit 34. The plug sleeve unit 31 is adapted to be sleeved on the second optical fiber cable 200'. The plug unit 32 is connected to a front end of the plug sleeve unit 31, is adapted for insertion of the second optical fiber cable 200' thereinto, and is insertable into the connecting hole 222 of the socket shell 22 of the optical fiber socket 2. The plug guiding unit 33 is fixedly disposed in the plug unit 32 and is adapted to be connected to the second optical fiber cable 200'. The coupling unit 34 is sleeved on the plug unit 32.

The plug sleeve unit 31 of this embodiment includes a plug tail tube 311 connected to a rear end of the plug unit 32, and a plug tail cover 312 sleeved on the plug tail tube 311. The plug unit 32 includes a plug shell 321 connected to a front end portion of the plug tail tube 311 of the plug sleeve unit 31, and a plug head 324 threadedly connected to the plug shell 321 and insertable into the connecting hole 222 of the optical fiber socket 2. The plug shell 321 has a shell flange 322 and an internal shoulder part 323 disposed for abutment with the plug guiding unit 33. The plug head 324 has a head flange 325 spaced apart from the shell flange 322, an outer surface formed with an annular locking groove 326 that is spaced apart from the head flange 325 and that is disposed for engagement with the locking members 225 of the optical fiber socket 2, and a plurality of second engaging hooks 327 extending into the plug shell 321. The head flange 325 of the plug unit 32 is located between the locking groove 326 and the second engaging hooks 327.

The plug guiding unit 33 of this embodiment includes a second connecting member 331, a second ferrule 334, a second guiding tube 335, and a second resilient member 336. The second connecting member 331 is disposed fixedly between the plug shell 321 and the plug head 324 of the plug unit 32, and is adapted for insertion of the second optical fiber cable 200' therethrough. The second ferrule 334 is exposed from the plug head 324 of the plug unit 32, and is adapted to be connected to the second optical fiber cable 200'. The second guiding tube 335 has a portion penetrating into the second ferrule 334 from an end surface which faces the second connecting member 331, and an opposite portion adapted to surround the second optical fiber cable 200'. The second resilient member 336 has two ends that respectively abut against the second ferrule 334 and the second connecting member 331 for biasing the second ferrule 334 away from the second connecting member 331.

The second connecting member 331 of this embodiment is formed with a plurality of second engaging grooves 332, and a second flange 333 abutting against the internal shoulder part 323 of the plug shell 321. The second engaging hooks 327 respectively engage the second engaging grooves 332 of the second connecting member 331. The second flange 333 of the second connecting member 331 is located between the internal shoulder part 323 of the plug shell 321 and the second engaging hooks 327 of the plug head 324.

The coupling unit 34 of this embodiment includes a coupling sleeve 341 sleeved on the plug shell 321 and the plug head 324 of the plug unit 32, and a coupling resilient member 344 sleeved on the plug shell 321 and the plug head 324 of the plug unit 32, and having two ends that respectively abut against the plug unit 32 and the coupling sleeve 341. The coupling sleeve 341 of the coupling unit 34 has a sleeve body 342 sleeved on the plug shell 321 and the plug head 324 of the plug unit 32, and an internal protrusion 343 protruding inwardly from the sleeve body 342 and disposed between the shell flange 322 and the head flange 325. The two ends of the coupling resilient member 344 of the coupling unit 34 respectively abut against the internal protrusion 343 and the shell flange 322 for biasing the internal protrusion 343 toward the head flange 325.

Figure 7:
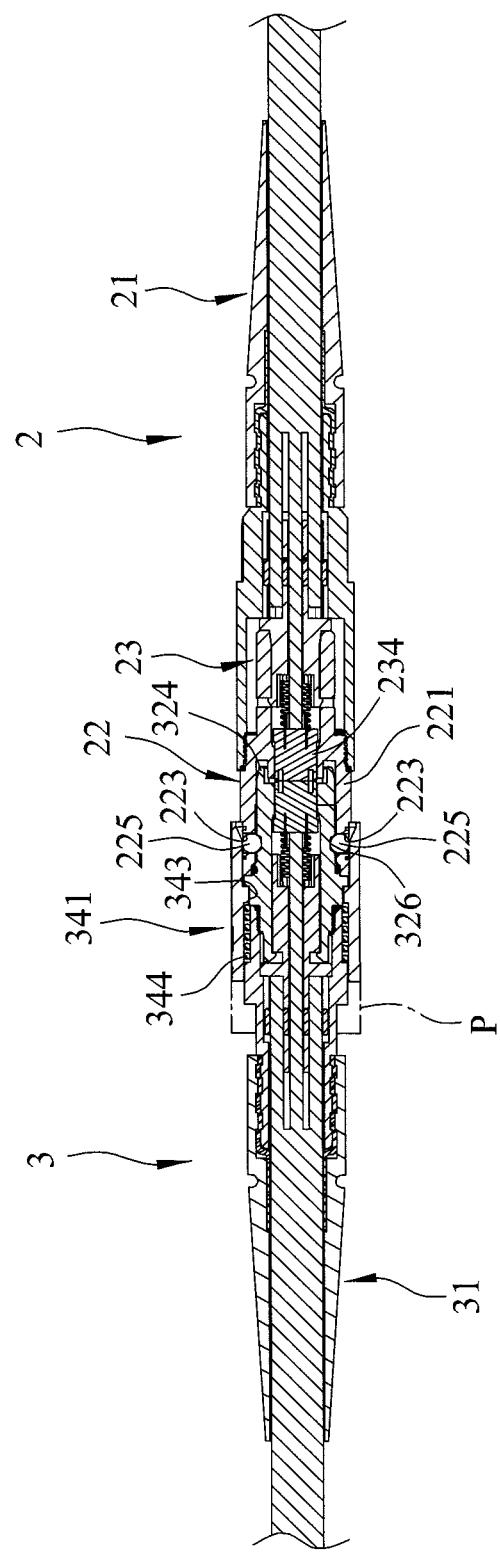
FIG. 7 is a sectional view of the exemplary embodiment.

As shown in FIG. 7 and referring back to FIGS. 3 and 6, when connecting the optical fiber socket 2 with the optical fiber plug 3, the plug head 324 of the optical fiber plug 3 is inserted into the connecting hole 222 of the optical fiber socket 2 and urges the locking members 325 to move radially and outwardly, so that the plug head 324 of the optical fiber plug 3 can be smoothly inserted into the optical fiber socket 2. In this way, the locking members 225 respectively move into the locking grooves 326 of the plug head 324 and clamp the optical fiber plug 3, thus the optical fiber socket 2 and the optical fiber plug 3 are securely connected to each other. Since the socket shell 22 is clamped between the coupling sleeve 341 and the plug head 324 and since the coupling sleeve 341 covers the locking members 225, the locking members 225 are urged by the sleeve body 342 of the coupling sleeve 341 to move toward and clamp tightly the plug unit 32 of the optical fiber plug 3, so as to prevent separation of the optical fiber socket 2 and the optical fiber plug 3. At this moment, the coupling sleeve 341 is movable against a resilient force provided by the coupling resilient member 344 to release the locking members 225, so as to permit separation of the optical fiber socket 2 from the optical fiber plug 3.

When disconnecting the optical fiber socket 2 from the optical fiber plug 3, a user should only need to pull the coupling sleeve 341 to a position (P) as shown in FIG. 7, such that the locking members 225 are no longer urged by the coupling sleeve 341 and can move radially and outwardly from the locking grooves 326 of the optical fiber plug 3 to allow separation of the optical fiber socket 2 and the optical fiber plug 3. Afterward, the coupling sleeve 341 may return to an original position shown in FIG. 6 by the resilient force provided by the coupling resilient member 344.

In conclusion, with such design, operations to connect and disconnect the optical fiber socket 2 and the optical fiber socket 3 of the present disclosure can be time-efficient and relatively convenient.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber socket adapted to be connected to an optical fiber plug and a first optical fiber cable, said optical fiber socket comprising:
   a socket sleeve unit adapted to be sleeved on the first optical fiber cable;
   a socket shell having
      a surrounding wall that is connected to said socket sleeve unit, and that defines a connecting hole adapted for insertion of the first optical fiber cable thereinto and adapted to be engaged with the optical fiber plug,
      a plurality of spaced-apart receiving holes that extend radially through said surrounding wall, and that communicate with said connecting hole, and
      a plurality of locking members that are movably and respectively disposed in said receiving holes; and
   a socket guiding unit disposed fixedly in said socket sleeve unit and said socket shell, exposed toward said connecting hole, and adapted to be connected to the first optical fiber cable;
   wherein, when said optical fiber socket is connected to the optical fiber plug, said locking members are urged to move toward and clamp the optical fiber plug.

2. The optical fiber socket as claimed in claim 1, wherein:
   said socket sleeve unit includes an outer sleeve threadedly connected to said socket shell; and
   said socket guiding unit includes
      a first connecting member connected fixedly to said outer sleeve, and adapted for insertion of the first optical fiber cable therethrough,
      a first ferrule exposed toward said connecting hole, and adapted to be connected to the first optical fiber cable,
      a first guiding tube having a portion that penetrates into said first ferrule from an end surface which faces said first connecting member, and an opposite portion that is adapted to surround the first optical fiber cable, and
      a first resilient member having two ends that respectively abut against said first ferrule and said first connecting member for biasing said first ferrule away from said first connecting member.

3. The optical fiber socket as claimed in claim 2, wherein:
   said socket shell further has a plurality of first engaging grooves; and
   said first connecting member of said socket guiding unit has
      a plurality of first engaging hooks extending into said surrounding wall of said socket shell, and respectively engaging said first engaging grooves of said socket shell, and
      a first flange clamped between said outer sleeve of said socket sleeve unit and said socket shell.

4. The optical fiber socket as claimed in claim 3, wherein:
   each of said locking members of said socket shell is a bead; and
   each of said receiving holes of said socket shell has two opposite openings, each of which has a diameter smaller than that of each of said locking members.

5. An optical fiber plug adapted to be connected to said optical fiber socket as claimed in claim 1 and a second optical fiber cable, said optical fiber plug comprising:
   a plug sleeve unit adapted to be sleeved on the second optical fiber cable;
   a plug unit connected to said plug sleeve unit, adapted for insertion of the second optical fiber cable thereinto, and insertable into said connecting hole of said socket shell of said optical fiber socket;
   a plug guiding unit fixedly disposed in said plug unit and adapted to be connected to the second optical fiber cable; and
   a coupling unit including a coupling sleeve that is sleeved on said plug unit, and a coupling resilient member that has two ends respectively abutting against said plug unit and said coupling sleeve;
   wherein, when said optical fiber socket is connected to said optical fiber plug, said locking members of said socket shell of said optical fiber socket are urged by said coupling sleeve to move toward and clamp said plug unit of said optical fiber plug; and wherein, when said optical fiber socket is connected to said optical fiber plug, said coupling sleeve is movable against a resilient force of said coupling resilient member to release said locking members to permit separation of said optical fiber socket from said optical fiber plug.

6. The optical fiber plug as claimed in claim 5, wherein:

said plug unit includes a plug shell connected to said plug sleeve unit, and a plug head threadedly connected to said plug shell and insertable into said connecting hole of said optical fiber socket;

said plug shell has a shell flange, and said plug head has a head flange spaced apart from said shell flange;

said coupling sleeve of said coupling unit has a sleeve body sleeved on said plug unit, and an internal protrusion protruding inwardly from said sleeve body and disposed between said shell flange and said head flange; and said two ends of said coupling resilient member of said coupling unit respectively abut against said internal protrusion and said shell flange for biasing said internal protrusion toward said head flange.

7. The optical fiber plug as claimed in claim 6, wherein said plug head has an outer surface formed with an annular locking groove that is disposed for engagement with said locking members of said optical fiber socket when said locking members are urged to move toward said plug unit.

8. The optical fiber plug as claimed in claim 7, wherein said plug guiding unit includes a second connecting member connected fixedly to said plug shell of said plug unit, and adapted for insertion of the second optical fiber cable therethrough, a second ferrule exposed from said plug head of said plug unit, and adapted to be connected to the second optical fiber cable, a second guiding tube having a portion that penetrates into an end surface of said second ferrule which faces said second connecting member, and an opposite portion that is adapted to surround the second optical fiber cable, and a second resilient member having two ends that respectively abut against said second ferrule and said second connecting member for biasing said second ferrule away from said second connecting member.

9. The optical fiber plug as claimed in claim 8, wherein:

said second connecting member is formed with a plurality of second engaging grooves and a second flange;

said plug shell further has an internal shoulder part, said second flange of said second connecting member abutting against said internal shoulder part;

said plug head further has a plurality of second engaging hooks respectively engaging said second engaging grooves of said second connecting member; and said second flange of said second connecting member is located between said internal shoulder part of said plug shell and said second engaging hooks of said plug head.

* * * * *